United States Patent [19]
Ozawa

[11] Patent Number: 5,875,766
[45] Date of Patent: Mar. 2, 1999

[54] SUPERCHARGING DEVICE FOR A VEHICLE ENGINE AND METHOD FOR CONTROLLING THE SAME

[75] Inventor: Godo Ozawa, Utsunomiya, Japan

[73] Assignee: Kabushiki Kaisha Komatsu Seisakusho, Tokyo, Japan

[21] Appl. No.: 578,523

[22] PCT Filed: Jul. 14, 1994

[86] PCT No.: PCT/JP94/01158

§ 371 Date: Dec. 29, 1995

§ 102(e) Date: Dec. 29, 1995

[87] PCT Pub. No.: WO95/02756

PCT Pub. Date: Jan. 26, 1995

[30] Foreign Application Priority Data

Jul. 14, 1993 [JP] Japan .................................. 5/196939

[51] Int. Cl.[6] .......................... F02B 39/06; F02B 37/04
[52] U.S. Cl. ............................................. 123/561; 60/609
[58] Field of Search .............................. 60/609; 123/561, 123/564

[56] References Cited

U.S. PATENT DOCUMENTS

| | | | |
|---|---|---|---|
| 1,645,178 | 10/1927 | Hall-Brown | 123/564 |
| 1,732,405 | 10/1929 | Invernizzi | 123/561 |
| 2,949,902 | 8/1960 | Calovolo | 123/561 |
| 3,296,791 | 1/1967 | Richard et al. | 123/561 |
| 3,349,759 | 10/1967 | Castelet | 123/561 |
| 3,665,787 | 5/1972 | Wilkinson | 123/561 |
| 3,673,797 | 7/1972 | Wilkinson . | |

FOREIGN PATENT DOCUMENTS

| | | | |
|---|---|---|---|
| 1810176 | 6/1969 | Germany | 123/561 |
| 44-1099 | 1/1969 | Japan . | |
| 47-12352 | 6/1972 | Japan . | |
| 60-135626 | 7/1985 | Japan | 60/609 |
| 479803 | 11/1969 | Switzerland | 123/561 |
| 619978 | 3/1949 | United Kingdom | 123/561 |

*Primary Examiner*—Michael Koczo
*Attorney, Agent, or Firm*—Sidley & Austin

[57] ABSTRACT

Disclosed is a supercharging device for a vehicle engine, for use in construction machines, etc., that has high acceleration performance, that is compactly made but provides high output, and that provides good engine braking efficiency, and a method for controlling such a supercharging device. A vehicle engine of the present invention, on which is mounted a mechanical supercharger that is driven by mechanical means using an output of the engine, comprises: a differential planetary gear device (10), which is connected to the vehicle engine (1) and which has differential limiting means (L) for distributing power that is produced by the vehicle engine for driving a mechanical supercharger (40) and for driving; and the mechanical supercharger (40), which is to be driven by the differential planetary gear device (10). When the vehicle is at a halt and when the vehicle is to move, a brake (36) is applied to a power transmission system (20) of the vehicle to increase total power output by the engine (1) by using the differential planetary gear device (10); the power output is directed to the mechanical supercharger (40) to rotate the mechanical supercharger (40); the brake (36) is released upon receipt of a start command; the engine power output is distributed by the differential planetary gear device (10) for driving the mechanical supercharger (40) and for propelling the vehicle; and the vehicle is propelled and accelerated.

45 Claims, 13 Drawing Sheets

| No. | | SHIFT LEVER | ACCELERATION PEDAL | CLUTCH | BRAKE | LOCK-UP CLUTCH | RELIEF VALVE | MECHANICAL SUPERCHARGER ROTATION | WHEEL ROTATION | ENGINE GENERATED TORQUE |
|---|---|---|---|---|---|---|---|---|---|---|
| 1 | ACTIVATION | P | – | – | ON | ON | – | LOW ROTATION | HALTED | LOW TORQUE |
| 2 | WAITING FOR A SIGNAL CHANGE (HALTED) | N | – | – | ON | ON | ON | LOW ROTATION | HALTED | LOW TORQUE |
| 3 | STARTING AND ACCELERATION | 1 | – | ON | ON | – | – | HIGH ROTATION | HALTED | MIDDLE TORQUE |
| | | 1 | ON | ON | – | – | – | HIGH ROTATION | LOW ROTATION | HIGH TORQUE |
| | | 2 | ON | ON | – | – | – | MIDDLE ROTATION | MIDDLE ROTATION | MIDDLE TORQUE |
| | | 3 | ON | ON | – | – | – | LOW ROTATION | HIGH ROTATION | LOW TORQUE |
| 4 | STEADY DRIVING | 3 | – | ON | – | – | – | LOW ROTATION | HIGH ROTATION | LOW TORQUE |
| 5 | DECELERATION | 3 | – | ON | – | ON | ON | HIGH ROTATION | HIGH ROTATION | LOW TORQUE |
| | | 2 | – | ON | – | ON | – | MIDDLE ROTATION | MIDDLE ROTATION | MIDDLE TORQUE |
| | | 1 | – | ON | – | ON | – | LOW ROTATION | LOW ROTATION | MIDDLE TORQUE |
| 6 | HALT | 1 | – | – | ON | ON | – | HIGH ROTATION | HALTED | MIDDLE TORQUE |
| | | N | – | – | ON | ON | – | LOW ROTATION | HALTED | LOW TORQUE |
| 7 | ENGINE STOP | P | – | – | ON | ON | – | LOW ROTATION | HALTED | ZERO |

FIG. 3

| No. | | SHIFT LEVER | ACCELERATION PEDAL | CLUTCH | BRAKE | LOCK-UP CLUTCH | RELIEF VALVE | MECHANICAL SUPERCHARGER ROTATION | WHEEL ROTATION | ENGINE GENERATED TORQUE |
|---|---|---|---|---|---|---|---|---|---|---|
| 1 | ACTIVATION | P | — | — | ON | ON | — | LOW ROTATION | HALTED | LOW TORQUE |
| 2 | WAITING FOR A SIGNAL CHANGE (HALTED) | N | — | — | ON | ON | — | LOW ROTATION | HALTED | LOW TORQUE |
| | | 1 | — | — | ON | ON | ON | LOW ROTATION | HALTED | LOW TORQUE |
| 3 | STARTING AND ACCELERATION | 1 | ON | ON | — | ON | — | MIDDLE ROTATION | LOW ROTATION | MIDDLE TORQUE |
| | | 2 | ON | ON | — | ON | — | HIGH ROTATION | MIDDLE ROTATION | HIGH TORQUE |
| | | 3 | ON | ON | — | — | — | LOW ROTATION | HIGH ROTATION | LOW TORQUE |
| 4 | STEADY DRIVING | 3 | — | ON | — | — | — | LOW ROTATION | HIGH ROTATION | LOW TORQUE |
| 5 | DECELERATION | 3 | — | ON | ON | — | — | LOW ROTATION | HIGH ROTATION | LOW TORQUE |
| | | 2 | — | ON | ON | ON | — | MIDDLE ROTATION | MIDDLE ROTATION | MIDDLE TORQUE |
| | | 1 | — | ON | ON | ON | — | LOW ROTATION | LOW ROTATION | LOW TORQUE |
| 6 | HALT | 1 | — | — | ON | — | ON | HIGH ROTATION | HALTED | MIDDLE TORQUE |
| | | N | — | — | ON | ON | — | LOW ROTATION | HALTED | LOW TORQUE |
| 7 | ENGINE STOP | P | — | — | ON | ON | — | LOW ROTATION | HALTED | ZERO |

FIG. 6

SUPERCHARGING DEVICE FOR A VEHICLE ENGINE AND METHOD FOR CONTROLLING THE SAME

FIELD OF THE INVENTION

The present invention relates to a supercharging device for a vehicle engine, and a control method therefor, and in particular to a supercharging device for an engine that supercharges air that is supplied to a vehicle engine that is to be used in a construction machine, etc., to increase the output of the engine, and to a control method therefor.

BACKGROUND OF THE INVENTION

Conventionally, supercharging devices are employed for vehicle engines that are used in cars, trucks, wheel loaders, wheel cranes, etc., that run on wheels, so that a high power output with a compact size can be provided while obtaining the acceleration. As such supercharging devices (superchargers), there are a mechanical supercharging system, which employs a part of an engine's output or power from another mechanism, and a turbocharger system that employs exhaust gas. In the mechanical supercharging system, a compressor, such as a Roots blower supercharger, which is commonly employed, is mechanically driven by an engine via a belt, etc.

In a conventional mechanical supercharging system, however, meaningless supercharging at a predetermined level or higher is performed within a high-speed and low-load range, even though it is not necessary. The mechanical power loss due to the supercharger is thus increased, and the overall efficiency of the engine is degraded. In a supercharging system that uses a turbocharger, the acceleration for the vehicle is inferior when the engine acceleration is begun at a low idle rotational state. Since the exhaust energy provided by the engine is low and the rotation of the turbocharger is reduced accordingly, the volume of the pressurized air that is charged to the engine in this state is small, and a high torque can not be generated. As a result, turbo lag occurs, there is a slight delay before the vehicle begins to accelerate, and the operator feels that the vehicle is not responding well. In addition, when a high output engine that provides little exhaust is adapted for use with a supercharger, engine braking efficiency is reduced.

DISCLOSURE OF THE INVENTION

To resolve the above described conventional shortcomings, it is one object of the present invention to provide a supercharging device for a vehicle engine, for use in construction machines, etc., that has high acceleration performance, that is compactly made but provides high output, and that provides good engine braking efficiency, and a method for controlling such a supercharging device.

According to the present invention, a vehicle engine, on which is mounted a mechanical supercharger that is driven by mechanical means using an output of the engine, comprises: a differential planetary gear device, which is connected to the vehicle engine and which has differential limiting means for distributing power, that is produced by the vehicle engine, for driving a mechanical supercharger and for propelling the vehicle; and the mechanical supercharger, which is to be driven by the differential planetary gear device. The vehicle engine comprises an accelerator position detection sensor, which is additionally attached to an accelerator that controls an output of the vehicle engine, or an engine rotational speed detection sensor, for detecting a rotational speed of the vehicle engine; a shift position detection sensor, which is additionally provided for a shift lever by which a speed range of a vehicle is selected; and a controller that receives signals from the accelerator position detection sensor, the engine rotational speed detection sensor, and the shift position detection sensor, and that controls the differential limiting means of the differential planetary gear device. The differential limiting means of the differential planetary gear device is controlled by the controller, which receives a speed signal from a vehicle speed detection sensor that is attached to a drive shaft of the vehicle.

Further, the present invention comprises: a differential planetary gear device, which is connected to an engine and which has differential limiting means for distributing power, that is produced by the engine, for mechanical supercharging and for vehicle propulsion; a mechanical supercharger, which is to be driven via the differential planetary gear device; a turbosupercharger, which is to be driven by exhaust gas from the engine; and an air supply circuit opening and closing valve that is provided between the mechanical supercharger and the turbosupercharger. An exhaust circuit opening and closing valve is positioned in an exhaust gas circuit that is located between the engine and the turbosupercharger. Provided for the engine are an accelerator position detection sensor, which is additionally attached to an accelerator that controls an output of the engine, or an engine rotational speed detection sensor, for detecting a rotational speed of the engine; a shift position detection sensor, which is additionally provided to a shift lever for selecting a speed of a vehicle; and a controller that receives signals from the accelerator position detection sensor, the engine rotational speed detection sensor, and the shift position detection sensor, and that controls the differential limiting means of the differential planetary gear device, the air supply circuit opening and closing valve, and the exhaust circuit opening and closing valve. The differential limiting means of the planetary gear device and the air supply circuit opening and closing valve are controlled by the controller, which receives a vehicle speed signal from a vehicle speed detection sensor that is attached to a drive shaft of the vehicle. A relief valve that adjusts air pressure is provided for the air supply circuit of the mechanical supercharger. The relief valve that adjusts the air pressure is controlled by the controller that receives signals from the vehicle speed detection sensor, the engine rotational speed detection sensor, and the shift position detection sensor.

In addition, according to the present invention, a method, for controlling a supercharging device for a vehicle engine for which engine output is increased by employing a mechanical supercharger, or both a mechanical supercharger, which is driven by a mechanical means, and a turbosupercharger which uses an exhaust of the engine, comprises, when a vehicle is at a halt and is to move, a step of braking a power transmission system of the vehicle to increase total power output by the engine by using a differential planetary gear device; a step of directing the power output to the mechanical supercharger to rotate the mechanical supercharger; a step of releasing a brake upon receipt of a start command; a step of distributing the engine power output with the differential planetary gear device for driving the mechanical supercharger and for propelling the vehicle; and a step of propelling and accelerating the vehicle. When the vehicle begins to be driven from a halt and is in a state of acceleration, the differential limiting means for the differential planetary gear device is engaged so that the engine output is directly coupled with the mechanical supercharger to propel and accelerate the vehicle. While the vehicle is traveling at a steady high speed, after the vehicle has been shifted from an acceleration state and has begun to travel at the steady high speed, the differential limiting means for the differential planetary gear device is unlocked to reduce power loss at the mechanical supercharger, and an air supply circuit opening and closing valve is so set as to alter a supply of air for the engine that is directed from the mechanical supercharger to the turbosupercharger. If the vehicle is being decelerated, when the vehicle is to be shifted to a decelerated state from traveling at a steady high speed, the differential limiting means of the differential planetary gear device is engaged to distribute the engine power output to drive the mechanical supercharger and to propel the vehicle, and a braking action is applied to the mechanical supercharger to increase the braking force for the vehicle.

Moreover, according to the present invention, when a vehicle is propelled from the halted state, a power transmission system of the vehicle is braked to accelerate the engine and to increase the power output by the engine by using a differential planetary gear device and to direct the resultant power output to a mechanical supercharger, and an exhaust circuit opening and closing valve is so set as to discharge directly into surrounding atmosphere an exhaust from the engine; and when the vehicle has been shifted from an accelerated state to a steady high speed driving state, and is fully in the steady high speed driving state, the differential limiting means for the differential planetary gear device is unlocked to reduce the power loss at the mechanical supercharger, and the air supply circuit opening and closing valve and the exhaust circuit opening and closing valve are set so as to supply air to the engine from the turbosupercharger and to supply an exhaust from the engine to the turbosupercharger. When the vehicle is shifted from a steady high speed driving state to the decelerated state, the air supply circuit opening and closing valve setting is changed so that air is supplied to the engine from the mechanical supercharger rather than from the turbosupercharger, an air supply circuit for the mechanical supercharger is throttled to increase power loss at the mechanical supercharger, and a braking action is applied to increase the braking force for the vehicle. When a shift lever of the vehicle is set to neutral and the vehicle is halted, the pressure of the air that is supplied from the mechanical supercharger to the engine is decreased in order to reduce the power loss at the mechanical supercharger.

With the above described structure, when a low speed setting, such as forward first or forward second, is selected and a halted vehicle begins to be driven forwardly, the quantity of air that the engine requires is supplied by a mechanical supercharger that is driven by the engine output and that is accelerated by mechanical means via the differential planetary gear device. The engine output rises sharply and the response by the vehicle is enhanced. Further, during a period from the time that a vehicle begins to be driven until it is shifted to steady high speed driving, a rotational speed of the mechanical supercharger that is consonant with the rotational speed of the engine is acquired by engaging the differential limiting means of the differential planetary gear device, so that even a small engine has a good response, which is a characteristic of a mechanical supercharger, and provides a high engine power output.

When the vehicle is shifted to steady high speed driving, the turbosupercharger is used instead of the mechanical supercharger, to eliminate the wasteful charging of a predetermined air quantity or more, which is not required, and the overall efficiency of the engine is improved. When the vehicle is at a halt, the charging pressure from the mechanical supercharger is lowered, and thus the power loss and the fuel consumption are reduced.

During the deceleration of the vehicle, since the differential limiting means of the differential planetary gear device is engaged, the forcible rotational torque that is provided by the wheels of the vehicle is shared by both the engine and the mechanical supercharger, and the braking force is therefore increased.

As the output characteristic in a low-speed high-load area is drastically increased as a whole, the matching characteristic of the engine torque and the vehicle traveling load, or the fuel consumption g/psh, is changed from that for the prior art shown in FIG. 15 to that for the present invention shown in FIG. 16. That is, referring to the matching points for engine torque and for vehicle traveling load, conventional matching points ①and ②in FIG. 15 are changed to the matching points (1) and (2) for the present invention, which can be located in a lower-speed and preferable fuel-consumption area. Therefore, a low fuel consumption and low noise during actual driving can be provided.

BRIEF DESCRIPTION OF THE DRAWINGS

FIG. 3 is an explanatory diagram for the operating states of the supercharging device, vehicle speeds, a shift lever positions, etc., according to the first embodiment;

FIG. 6 is an explanatory diagram for the supercharging device, the vehicle speeds, the shift lever positions, etc., according to a second embodiment;

BEST MODES FOR CARRYING OUT THE INVENTION

A first embodiment according to the present invention for a supercharging device for a vehicle engine and a control method therefor will now be described in detail while referring to FIGS. 1 through 5.

Figure 1:
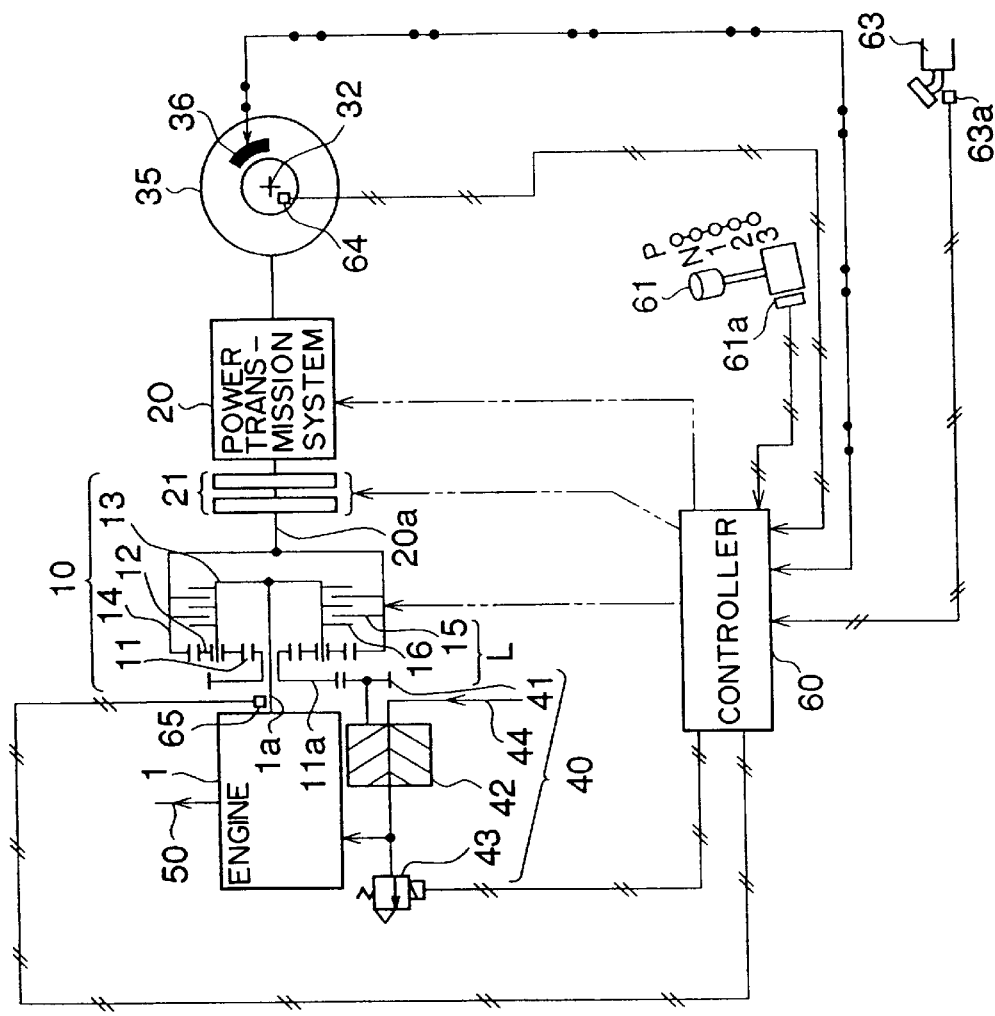
FIG. 1 is an explanatory diagram for a supercharging device for a vehicle engine according to a first embodiment of the present invention.

As is shown in FIG. 1, a differential planetary gear device 10 is attached to an output shaft 1a of an engine 1. Power from the differential planetary gear device 10 is divided into two parts, with one part being transmitted to a drive force transmission system 20 that is constituted by a transmission, etc., and the other part being transmitted to a mechanical supercharger 40 that impels air that is fed to the engine 1. Exhaust gas is discharged from the engine 1 via an exhaust pipe 50.

The differential planetary gear device 10 includes a sun gear 11, a planet gear 12, a planet carrier 13, a ring gear 14, and a differential limiting means, i.e., a lockup clutch L that comprises differential limiting members 15 and 16.

The planet carrier 13 is securely coupled to the output shaft 1a of the engine 1, and normally three planet gears 12 are rotatably attached at equal intervals to the planet carrier 13. The sun gear 11 is engaged inwardly of the three planet gears 12, and the ring gear 14 is engaged outwardly. The output shaft 1a of the engine 1 is provided rotatably inwardly of the sun gear 11. A gear 11a is located at one end of the sun gear 11, and a drive gear 41, for the mechanical supercharger 40, engages the gear 11a. A drive shaft 20a of the driving force transmission system 20 is coupled with the ring gear 14. The differential limiting members 15 and 16 are located inwardly of the ring gear 14 and outwardly of the planet carrier 13. The differential limiting member 15 is securely fixed to the ring gear 14, while teeth that are provided inwardly on the differential limiting member 16 engage teeth (not shown) that are provided outwardly of the planet carrier 13. The differential limiting member 16 is located so as to be slidable in the axial direction, and is pressed toward the differential limiting member 15 by a piston (not shown). The differential planetary gear device 10 is connected to the driving force transmission system 20 via a clutch 21.

Although there are various transmissions that could be used as the driving force transmission system 20, in this example for the present invention only an explanation of a transmission for moving forwardly will be given. Other transmissions that can be employed are a transmission system for a planetary gear device and a hydraulic clutch, and a transmission system for a planetary gear device and a solenoid clutch.

The driving force of the driving force transmission system 20 is finally transmitted to a wheel 35. A brake 36 is provided for the wheel 35. A signal to the driving force transmission system 20, which is indicated by the chain double-dashed line, can be an electric signal or a signal that is controlled by a hydraulic valve. The mechanical supercharger 40 includes the drive gear 41, a compressor 42, such as a Lysholm compressor, a relief valve 43 for adjusting charging pressure, and an air supply pipe 44 for the air supply circuit. The relief valve 43 receives a signal from a controller 60, which will be described later, and adjusts the pressure setting.

The controller 60, which is constituted by a computer, etc., receives signals from a shift position detection sensor 61a that is provided for a shift lever 61, an accelerator position detection sensor 63a that is provided for an accelerator pedal 63, which is an acceleration device, a vehicle speed detection sensor 64 that is provided for a drive shaft 32, and an engine rotational speed detection sensor 65 that is provided for the output shaft 1a of the engine, and stores them or performs computations, which will be described later. The controller 60 outputs operation command signals to the lock-up clutch L, the driving force transmission system 20, the clutch 21, the brake 36, and the relief valve 43. It should be noted that there is no clutch pedal, and that, rather than being performed manually, all the operations for the clutch 21 are performed mechanically, in consonance with command signals from the controller 60.

The processing for this embodiment will now be explained.

First, when a vehicle is accelerated from a standstill (hereafter referred to as "zero acceleration"), the operator positions the shift lever 61 for forward first. Upon receipt of a "forward first" signal from the shift position sensor 61a, and a "the accelerator pedal has not yet been depressed" signal from the accelerator position shift sensor 63a, the controller 60 continues the "maintain the brake 36 in the operating state" command, and sets an air pressure of "almost zero" by outputting a command to the relief valve 43. The controller 60 then issues an engagement command to the clutch 21, which is engaged in turn. Since the operation of the engaged clutch 21, the power transmission system 20, and the brake 36 stops the wheel 35 and thus the vehicle is accordingly halted, the ring gear 14 of the differential planetary gear device 10 is fixed in place.

The output of the engine 1 is therefore transmitted via the output shaft 1a, the planet carrier 13, the planet gear 12, the sun gear 11, and the gear 11a, in the named order, to drive the compressor 42.

The rotational speed of the sun gear 11 at this time is increased, as is represented by the following expression:

$$Ns = (Zr + Zs) \times Np / Zs, \qquad (1)$$

where Ns: rotational speed of sun gear 11

Np: rotational speed of planet carrier 13

Zr: number of teeth of ring gear 14

Zs: number of teeth of sun gear 11.

The compressor 42, that is to be driven via the gear 11a, is rotated at high speed. Further, since the driving output of the compressor 42 is very small because it is set to almost zero by the relief valve 43, and since all the output of the engine 1 is transmitted to the compressor 42, the rotational speed of the compressor 42 rises suddenly.

Following this, when, by examining a signal from the engine rotational speed detection sensor 65 or a depression strength signal from the accelerator position detection sensor 63a, it is ascertained that the operator "is depressing the accelerator pedal to accelerate the vehicle from a standstill," the controller 60 transmits a command to the relief valve 43 to close and sets the charging pressure to a predetermined value. At the same time, the controller 60 issues a command to release the brake 36. Through this process, the output of the engine 1 rises drastically as a large quantity of air is supplied to the engine 1, acceleration is performed with little time lag, and the vehicle is started forwardly.

While the vehicle is gradually shifted from the acceleration phase to high speed driving, and as the shift lever 61 is moved from forward first to second and to third, the load on the wheel 35 is altered from a low-speed, high load to a high-speed, low load. Since the differential planetary gear device 10 is provided, the load on the mechanical supercharger 40 is altered from a high load to a low load, accordingly, so that wasteful mechanical loss does not occur and so that economical driving can be performed.

Figure 2:
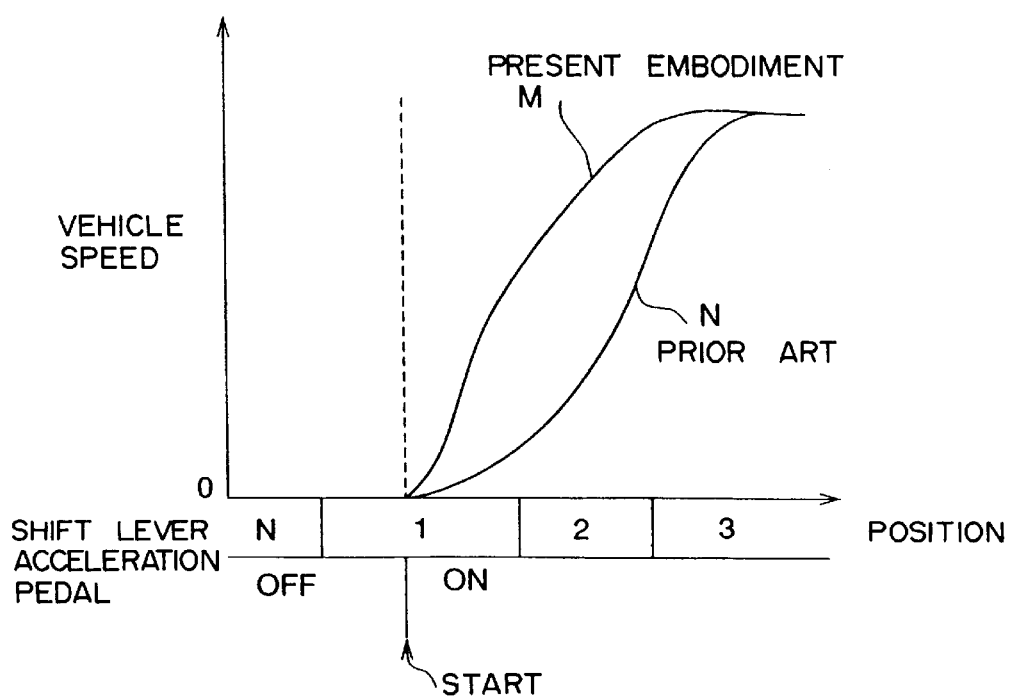
FIG. 2 is a graph for explaining the rises in the engine output with the supercharging device in FIG. 1 and with a conventional supercharging device.

As is described above, when the vehicle is halted or is waiting for a signal change, all of the output of the engine 1 is transmitted to the compressor 42 to increase the supplied charging pressure. Then, at the same time as the accelerator pedal 63 is depressed, the brake 36 is released to acquire a sharp acceleration force for the vehicle; and after the speed has increased, the load on the mechanical supercharger 40 is reduced to provide economical driving. When the prior art and this embodiment are compared with each other, as is shown in FIG. 2, wherein the vertical axis represents the vehicle speed and the horizontal axis represents speed change position, the result that is obtained with this embodiment is as shown by solid line M, and a rise occurs earlier than the prior art, which is indicated by a solid line N.

Figure 4:
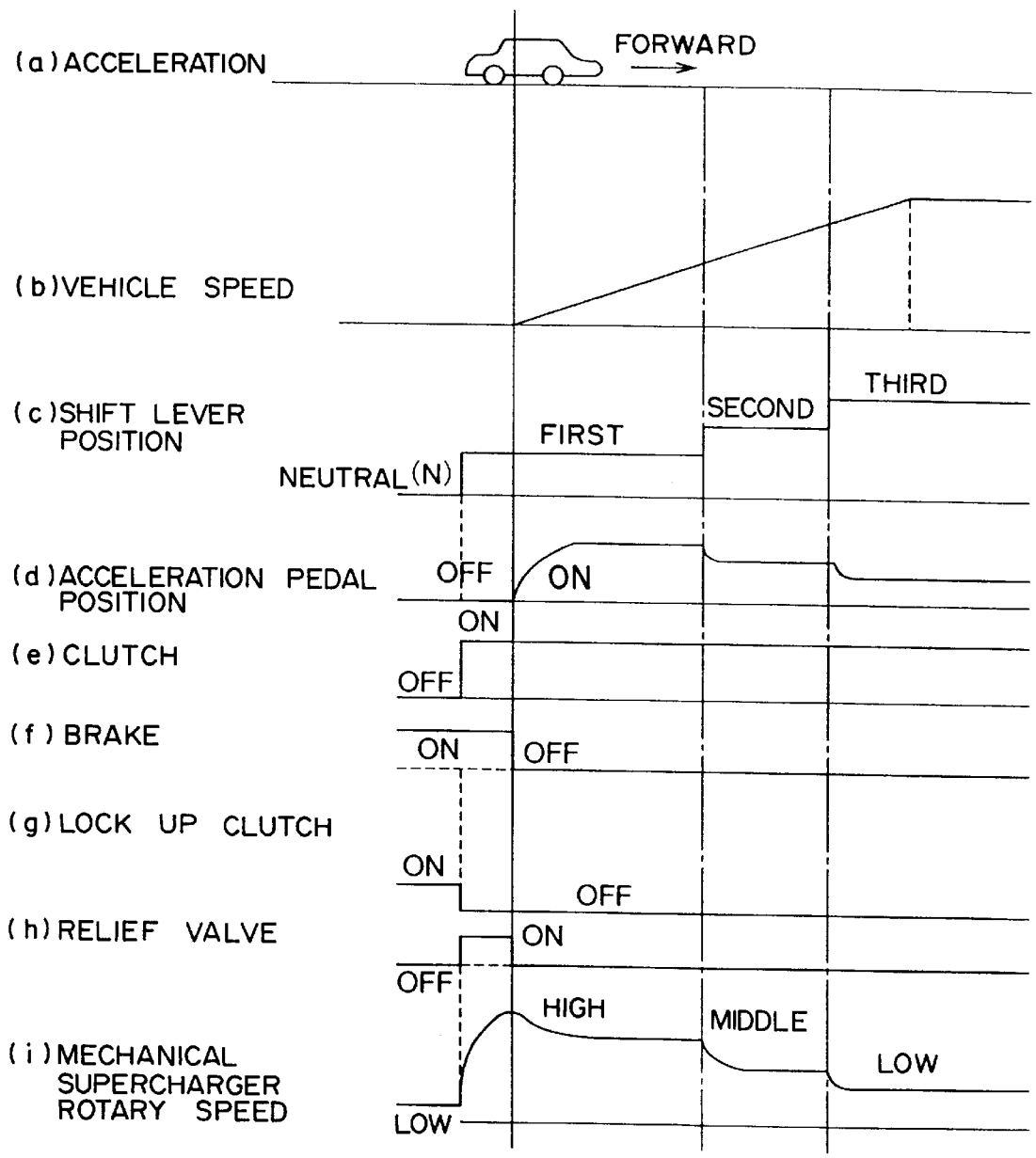
FIG. 4 is a time chart for the supercharging device, the vehicle speeds, the shift lever positions, etc., at the time of acceleration, according to the first embodiment.
Figure 5:
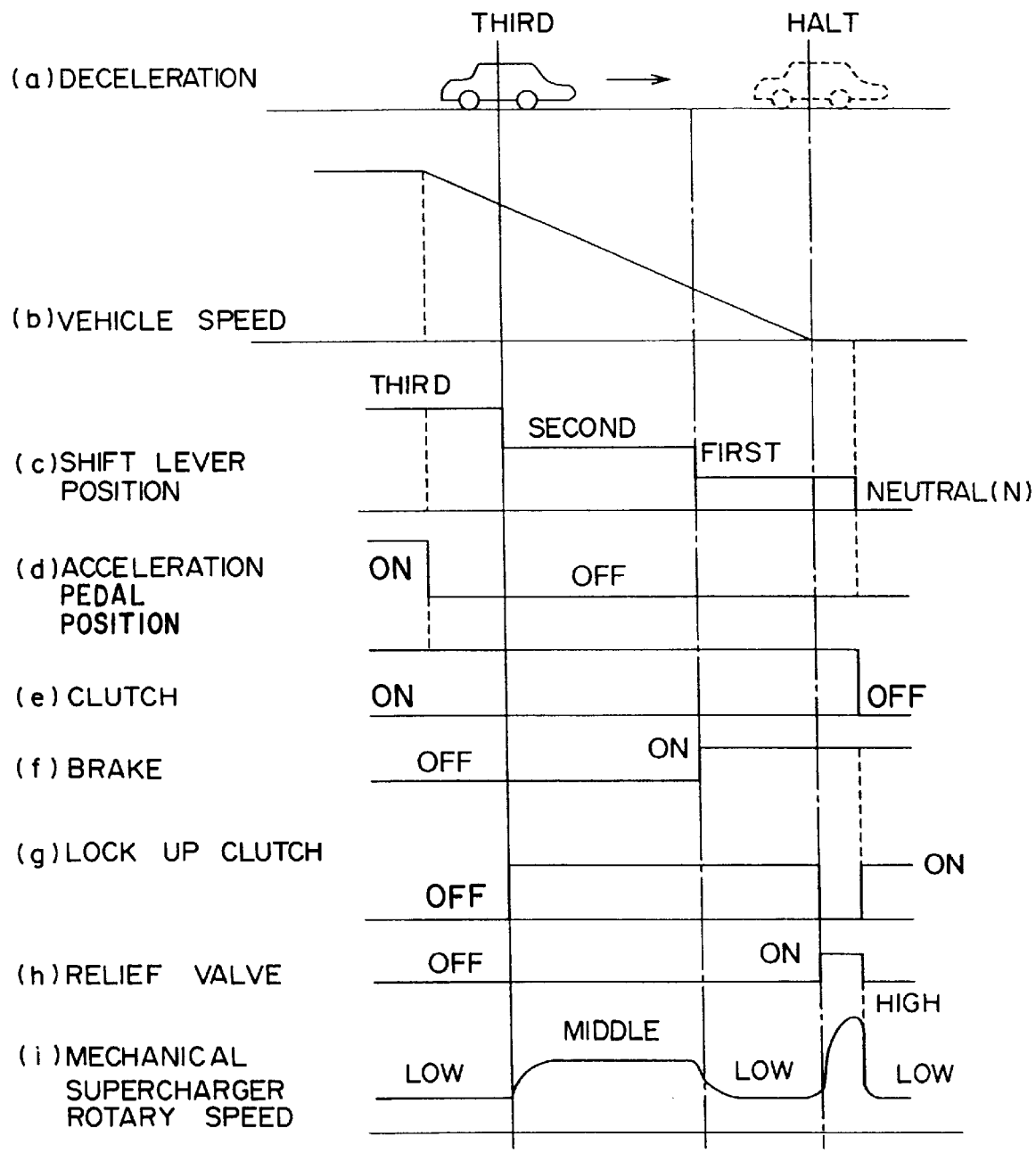
FIG. 5 is a time chart for the supercharging device, the vehicle speeds, the shift lever positions, etc., at the time of deceleration, according to the first embodiment.

FIG. 3 shows the operating states of the supercharger, the vehicle speeds, the shift lever positions, etc., according to this embodiment; FIG. 4 is a time chart, at the time of acceleration, for the supercharger, the vehicle speeds, the shift lever positions, etc., and FIG. 5 is a time chart at the time of deceleration for the supercharger, the vehicle speeds, the shift lever positions, etc. Although, in this embodiment, the relief valve 43 is opened to provide a lower pressure, the state of the relief valve 43 can be kept unchanged and the charging pressure of the compressor 42 can be maintained high.

When the vehicle is decelerated from the steady driving (hereafter referred to as "deceleration driving"), an operator moves the shift lever 61 from forward third to second, and removes his foot from the accelerator pedal 63 to reduce the speed.

When the controller 60 receives, from the shift position detection sensor 61a, a detection signal for the change from forward third to second, and an accelerator-off detection signal from the accelerator position detection sensor 63a, the controller 60 switches from a forward-third gear row (not shown) to a forward-second gear row (not shown) in the driving force transmission system 20, and engages the clutch 21 and the lock-up clutch L.

The torque from the wheel 35 is then transmitted from the driving force transmission system 20 via the clutch 21 to the ring gear 14. Since the lock-up clutch L is engaged at this time, the ring gear 14, the planet carrier 13 and the sun gear 11 are locked, so that the rotational speed at which all of them rotate is the same. One torque force is carried from the lockup clutch L and the output shaft 1a to the engine 1 to give reverse driving force to the engine 1, i.e., to apply a braking moment on the engine. The other torque force is transmitted from the planet carrier 13, the planet gear 12, the sun gear 11 and the gear 11a to drive the compressor 42. The torque driving effect that is supplied to the compressor 42 is employed to reduce the vehicle speed, and to provide a so-called engine braking increased state. Thus, the strength of the braking effect is increased, compared with the conventional engine braking effect that is provided by only an engine.

Figure 7:
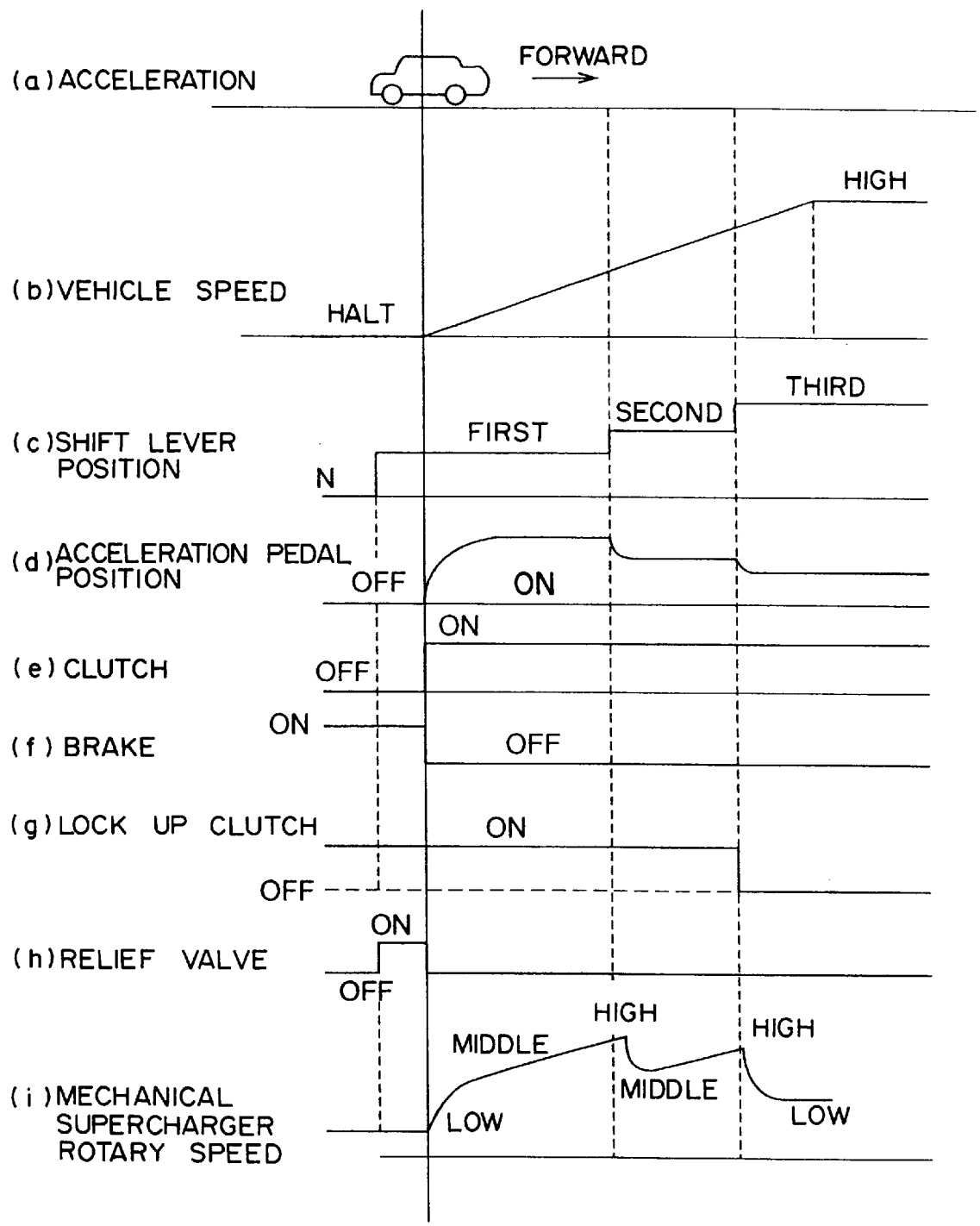
FIG. 7 is a time chart for the supercharging device, the vehicle speeds, the shift lever positions, etc., at the time of acceleration, according to the second embodiment.

An explanation will now be given, while referring to FIGS. 6 and 7, for a second embodiment that has the same structure as shown in FIG. 1 for the first embodiment, but according to which a control method is changed at the time of acceleration.

While in zero acceleration, the operator sets the shift lever 61 at the forward first position. When the controller 60 receives the "forward first" signal from the shift position detection sensor 61a, and an "accelerator pedal not yet depressed" signal from the accelerator position shift sensor 63a, the controller 60 issues a command to "maintain the brake 36 in the operating state" and to "maintain the clutch 21 in the disengaged state." On the other hand, the controller 60 issues to the lock-up clutch L a command to "engage lock-up clutch L."

In this manner, the ring gear 14, the planet carrier 13 and the sun gear 11 of the differential planet gear device 10 are locked so that the rotational speed of all of them is the same. In other words, the mechanical supercharger 40 is set in the directly connected driving state relative to the engine 1, and is ready for acceleration. The controller 60 issues a command for the relief valve 43 to open to reduce the driving loss at the mechanical supercharger 42.

Following this, when upon the receipt of a signal from the engine rotational speed detection sensor 65 and a signal for the degree of movement from the accelerator position detection sensor 63a it is detected that the operator "is depressing the accelerator pedal 63 to start and accelerate the vehicle," the controller 60 issues a command for the relief valve 43 to close, and sets the charging pressure to a predetermined value. At the same time, the controller 60 issues a command to release the brake 36 and to engage the clutch 21. Through this process, the output of the engine 1 smoothly rises while a charging pressure that provides a good response is acquired from the mechanical supercharger 40, which is directly connected and driven. The vehicle starts with little time lag and a strong acceleration.

The controller 60 maintains the directly connected driving method while the vehicle is shifted from acceleration to high speed driving and the shift lever 61 is changed from forward first to second. When the shift lever 61 is changed to third, the controller 60 receives a signal from the shift position detection sensor 61a and issues a release command to the lock-up clutch L. When the lock-up clutch L is released, the load on the wheel 35 is in the high-speed and low load state, and the mechanical supercharger 40 is accordingly changed to the low-load operation. Therefore, wasteful mechanical loss does not occur and economical driving is possible. As the control method that is employed at the time of steady driving and at the time of deceleration is the same as that in the first embodiment, an explanation for it will not be given. FIG. 6 shows the operating states of the supercharger in this embodiment, the vehicle speeds, the shift lever positions, etc.; and FIG. 7 is a time chart, at the time of acceleration, for the supercharger, the vehicle speeds, the shift lever positions, etc.

A third embodiment of the present invention will now be described while referring to FIGS. 8 through 11. The same reference numbers as are used in the first embodiment are also used to denote corresponding or identical components, and an explanation for them will not be given.

Figure 8:
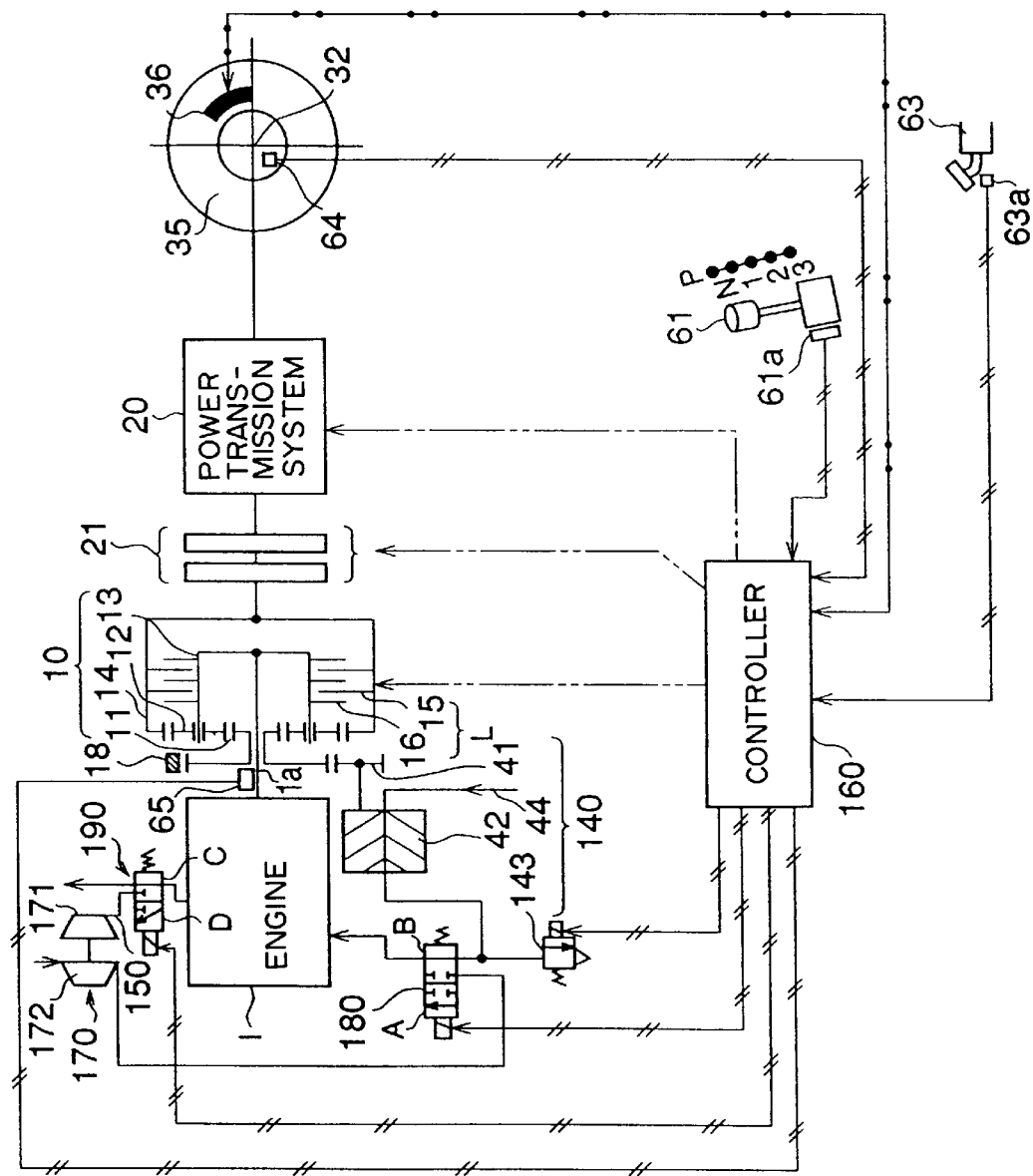
FIG. 8 is an explanatory diagram for a supercharging device according to a third embodiment.

In this embodiment, as is shown in FIG. 8, provided are a mechanical supercharger 140 and a turbosupercharger 170 that propel air to the engine 1, an air supply circuit opening and closing valve 180 that is located between the mechanical supercharger 140 and the turbosupercharger 170, and an exhaust circuit opening and closing valve 190, for the turbosupercharger 170, that is located at an exhaust pipe 150 for an engine 1.

The mechanical supercharger 140 includes a drive gear 41, a compressor 42, such as a Lysholm compressor, and a relief valve 143 for adjusting charging pressure. The relief valve 143 receives a signal from a controller 160, which will be described later, and adjusts the pressure setting.

The turbosupercharger 170 includes an exhaust turbine 171, which is driven by exhaust gas from the engine 1, and a compressor 172, which is driven by the exhaust turbine 171. In consonance with a signal from the controller 160, which will be described later, the air supply circuit opening and closing valve 180 is so set that air for the engine 1 can be supplied either from the mechanical supercharger 140 or from the turbosupercharger 170. The exhaust circuit opening and closing valve 190 is so set that the exhaust from the engine 1 is either transmitted to the turbosupercharger 170 or is directly discharged.

In addition to the commands described in the first embodiment, the controller 160, which is constituted by a computer, etc., issues a command to the relief valve 143 to adjust the pressure setting for the air that is supplied to the engine 1 by the mechanical supercharger 140, and a switching command to the air supply circuit opening and closing valve 180 and to the exhaust circuit opening and closing valve 190. It should be noted that there is no clutch pedal and that all the operations of the clutch 21 are performed mechanically, in consonance with command signals from the controller 160.

Figure 9:
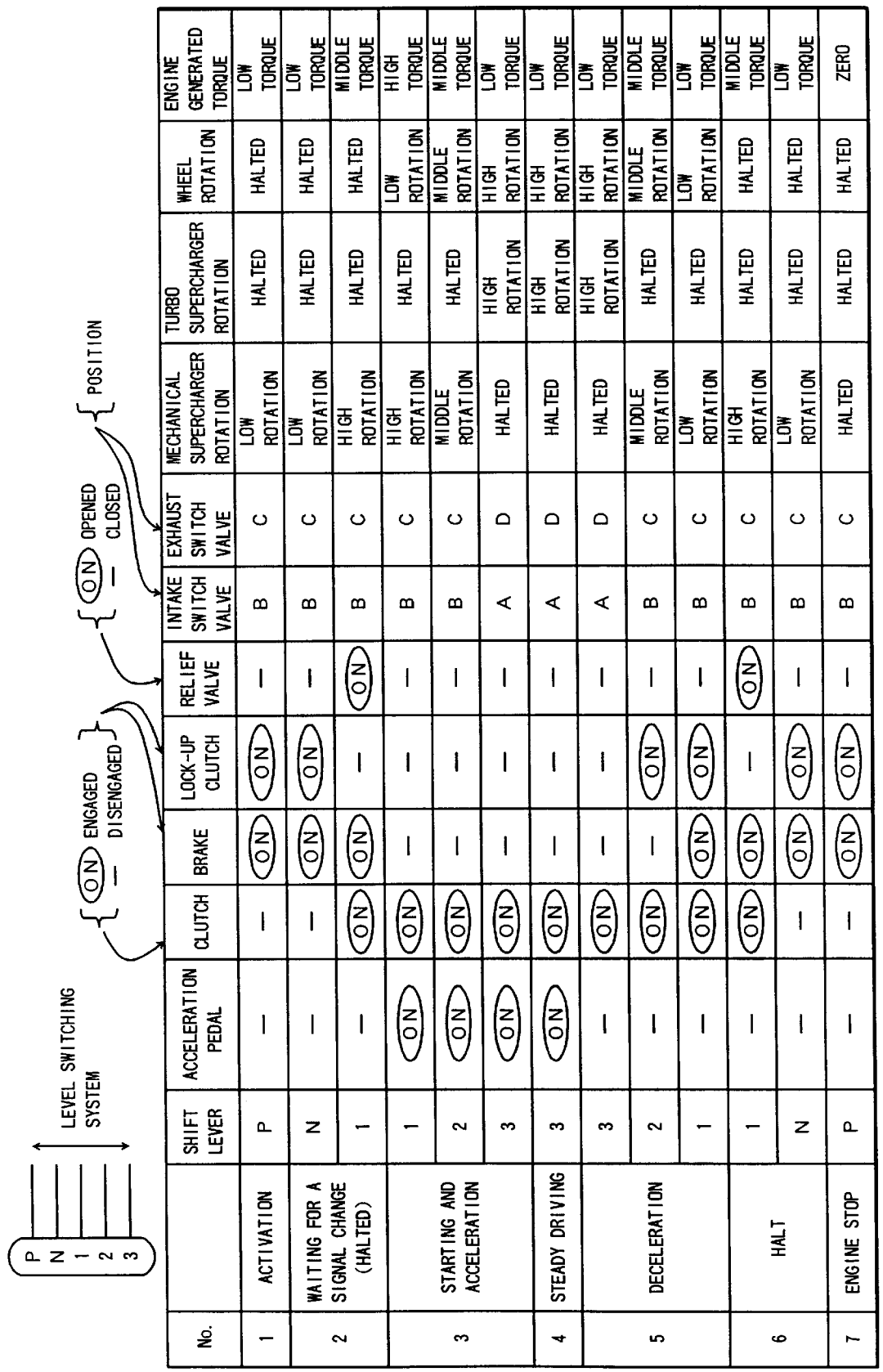
FIG. 9 is an explanatory diagram for the supercharging device, the vehicle speeds, the shift lever positions, etc., according to the third embodiment.
Figure 10:
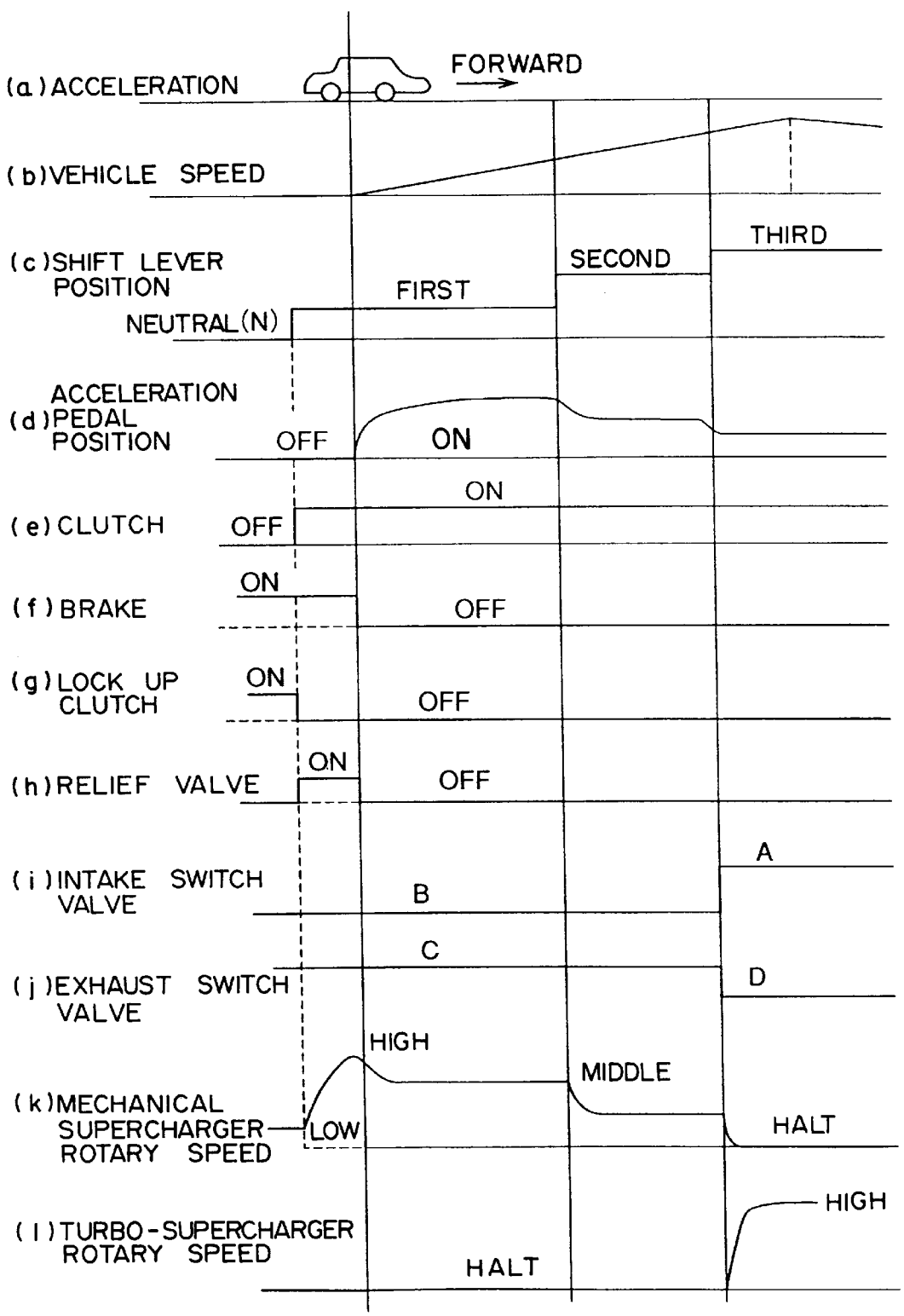
FIG. 10 is a time chart for the supercharging device, the vehicle speeds, the shift lever positions, etc., at the time of acceleration according to the third embodiment.
Figure 11:
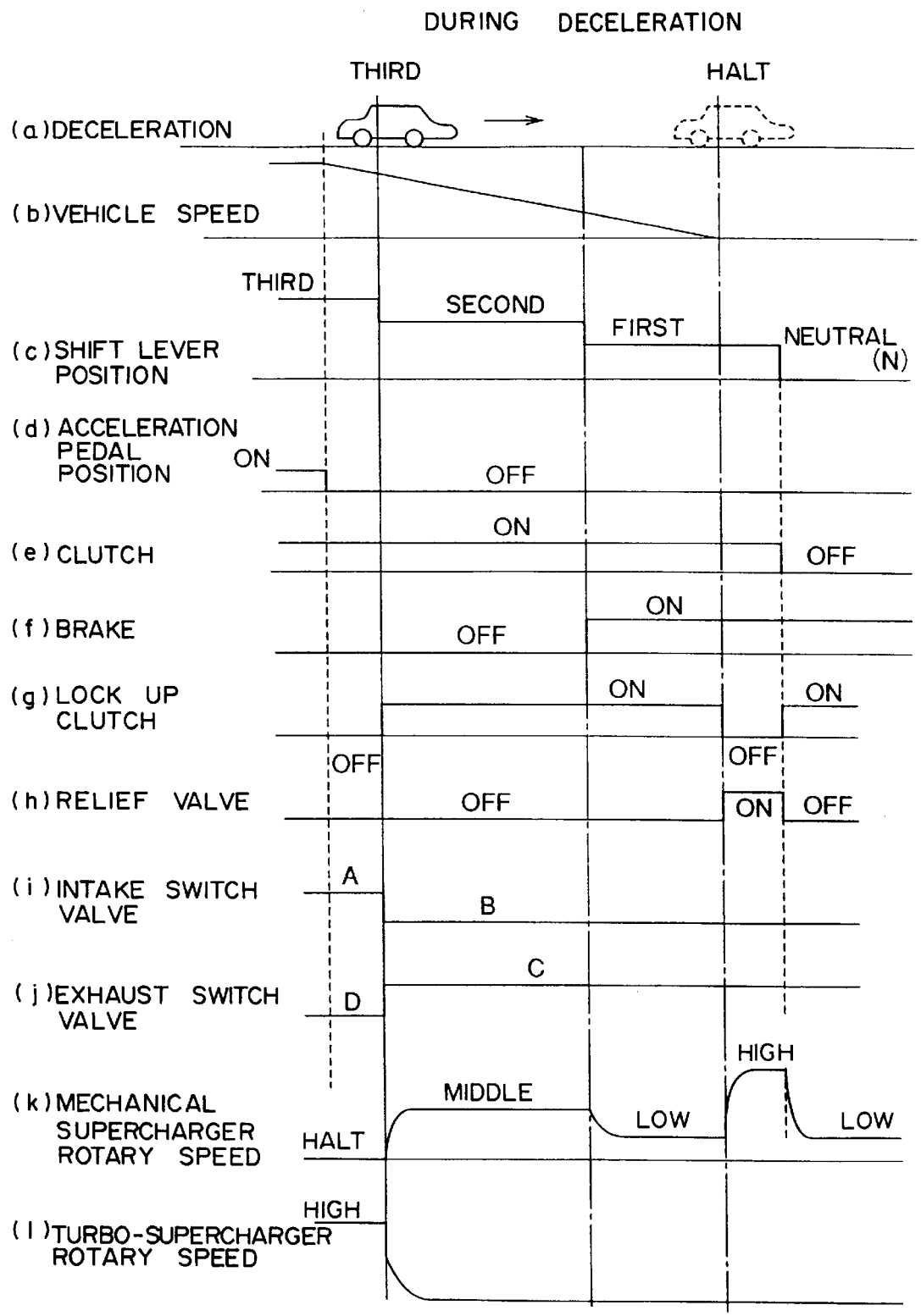
FIG. 11 is a time chart for the supercharging device, the vehicle speeds, the shift lever positions, etc., at the time of deceleration, according to the third embodiment.

The processing in this embodiment will now be described while referring to FIGS. 9 through 11. In FIG. 9, the vehicle states, such as start, waiting for a signal change, and forward acceleration, and the positions of the shift lever 61 in the individual states are entered in the columns. In the rows are entered the operations, such as the depression of the accelerator pedal 63, the engagement of the clutch 21 and the engagement of the lock-up clutch L, the positions of the air supply circuit opening and closing valve 180 and the exhaust circuit opening and closing valve 190, etc. FIGS. 10 and 11 are time charts for the operations, such as the vehicle speed, the positions of the shift lever 61, the engagement of the clutch 21, the engagement of the lock-up clutch L, the rotational speed of the mechanical supercharger 140, etc.

At the time of the starting of the vehicle, as is shown in FIG. 8, the shift lever 61 is set in the park position P, the accelerator pedal 63 is not depressed, the state of the lock-up clutch L is ON, which means engagement, and the mechanical supercharger 140 supplies air while the air supply circuit opening and closing valve 180 is at position B. When the shift lever 61 is placed into first through neutral N, the lock-up clutch L is released as is shown in FIG. 9, and at the same time the relief valve 143 is opened to lower the charging pressure. Since the brake 36 is engaged even through the clutch 21 is engaged, the wheel 36 does not rotate and all the output of the engine 1 is transmitted to the compressor 42. The speed of the compressor 42 is increased by expression (1). Further, since the exhaust circuit opening and closing valve 190 is located at position C, the turbosupercharger 170 is not activated and the exhaust gas is discharged directly to the atmosphere.

Under this condition, the vehicle is at the halted position as is shown on the left in FIG. 10, and is ready for driving at any time. At this time, as in the first embodiment, the mechanical supercharger 140 is being rotated at high speed by the increase in the speed of the differential planetary gear device 10.

When it is detected, from a signal from the accelerator position detection sensor 63a, that the operator "is depressing the accelerator pedal 63 to start and accelerate the vehicle," the controller 160 issues a command for the relief valve 143 to close and sets the air pressure to a predetermined value. At the same time, the controller 160 transmits a command to release the brake 36. Then, as a great quantity of air is supplied to the engine 1, the output of the engine 1 rises drastically, and acceleration is performed with little time lag, and the vehicle starts forwardly.

When the state of the vehicle is shifted to driving and acceleration and the shift lever 61 is moved from forward first to second and to third, the load on the wheel 35 is changed from a low-speed and high load to a high-speed, low load. The load on the mechanical supercharger 140 is also changed from high to low by the differential planetary gear device 10. When the shift lever 61 is placed in third, the controller 160 issues a command to the air supply circuit opening and closing valve 180, which is thereafter switched from position B to position A. The command is also issued to the exhaust circuit opening and closing valve 190, which is in turn switched from position C to position D. In this manner, the rotation of the mechanical supercharger 140 is completely halted and the turbosupercharger 170, which has low fuel consumption, is rotated at high speed.

During the steady driving at forward third, the turbosupercharger 170 that has low fuel consumption is driven, and the efficiency of fuel consumption is improved. The vehicle is in the steady driving state at third, as is shown in FIG. 10 on the right side.

A situation where the vehicle is shifted from the steady driving to deceleration (hereafter referred to as "deceleration driving") will be explained while referring to FIGS. 9 and 11.

The operator reduces speed by "moving the shift lever 61 from forward third to second and by removing his foot from the accelerator pedal 63." At this time, the controller 160 receives, from the shift position detection sensor 61a, a signal indicating the shift from forward third to second has been performed, and receives an accelerator-OFF detection signal from the accelerator position detection sensor 63a. Then, the controller 160 transmits a command to the air supply opening and closing valve 180, which is thereafter switched from position A to position B. The controller also issues a command to the exhaust circuit opening and closing valve 190, which in turn is switched from position D to position C. The rotation of the turbosupercharger 170 is thus halted and the rotation of the mechanical supercharger 140 is begun. In addition, the controller 160 outputs a command to the lock-up clutch L to engage the differential limiting members 15 and 16. The torque from the wheel 36 is therefore transmitted via the driving force transmission system 20 and the clutch 21 to the ring gear 14. Since the lock-up clutch L is engaged at this time, the ring gear 14, the planet carrier 13 and the sun gear 11 are all locked so that the rotational speed at which all of them rotate is the same. Then, one torque force is carried from the lock-up clutch L, via the output shaft 1a, to the engine 1 to transmit reverse driving force to the engine 1, so that the condition is the same as when engine braking is applied. The other torque force is transmitted from the planet carrier 13, via the planet gear 12, the sun gear 11, and the gear 11a, to the compressor 42. The driving torque of the compressor 42 serves as a torque force for speed reduction, and provides a so-called engine braking increased state. That is, the effect of the braking provided by the compressor 42 is increased compared with that of the conventional engine braking that is provided by using only the engine. At this time to adjust the braking effect by the compressor 42, the pressure setting for the relief valve 143 can be adjusted by transmitting a signal from the controller 160 in order to adjust the driving torque of the compressor 42.

Further, when the shift lever 61 is moved from second to first for deceleration, and the vehicle is finally halted, the vehicle speed detection sensor 64 detects that the vehicle is halted and transmits a signal to that effect to the controller 160. Upon receipt of the signal, the controller 160 outputs a command to the lock-up clutch L, and disengages the differential limiting members 15 and 16.

Figure 12:
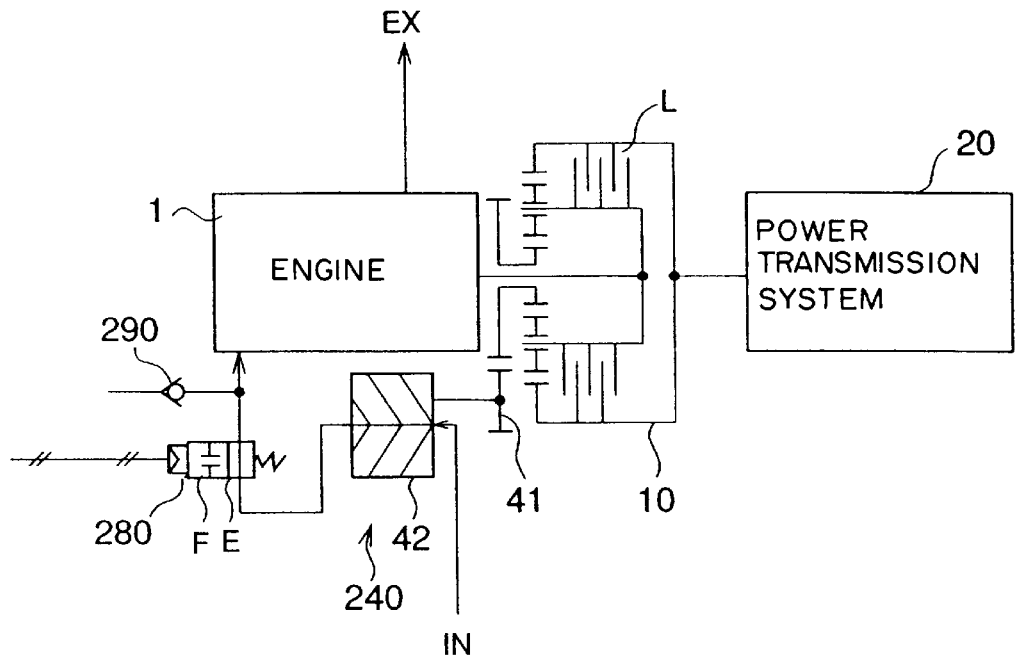
FIG. 12 is an explanatory diagram for a supercharging device according to a fourth embodiment.

A fourth embodiment will now be explained while referring to FIG. 12. The structure in this embodiment is the same as that of the first embodiment, except for only the structure of the mechanical supercharger 40 in the air supply circuit. More specifically, a mechanical supercharger 240 in this embodiment includes a drive gear 41, a compressor 42, such as a Lysholm compressor, an air supply circuit opening and closing valve 280 for controlling the supply of air from the compressor 42, and a check valve 290 that is located between the air supply opening and closing valve 280 and the engine 1.

With this arrangement, the air supply circuit opening and closing valve 280 is switched to position E to supply air to the engine 1 by the compressor 42, which is driven by the differential planetary gear drive 10, so that the output of the engine 1 rises earlier. In addition, in neutral, for a speed change, or at the time of halting, the lock-up clutch L of the differential planetary gear device 10 is disengaged, and rotation of the mechanical supercharger 240 is completely stopped to reduce the mechanical loss at the mechanical supercharger 240. At the time of switching to a high speed state, such as forward third, the air supply circuit opening and closing valve 280 is changed to position F and air is supplied from the side of a check valve 290 to the engine 1. In the high speed state, the lock-up clutch L of the differential planetary gear device 10 is disengaged to completely halt the rotation of the mechanical supercharger 240 and thus prevent an over supply of air. On the other hand, at the time of deceleration, the lock-up clutch L of the differential planetary gear device 10 is engaged and the mechanical supercharger 240 is employed to increase the braking force. Such a control process can be selected as needed by a command from a controller (not shown).

Figure 13:
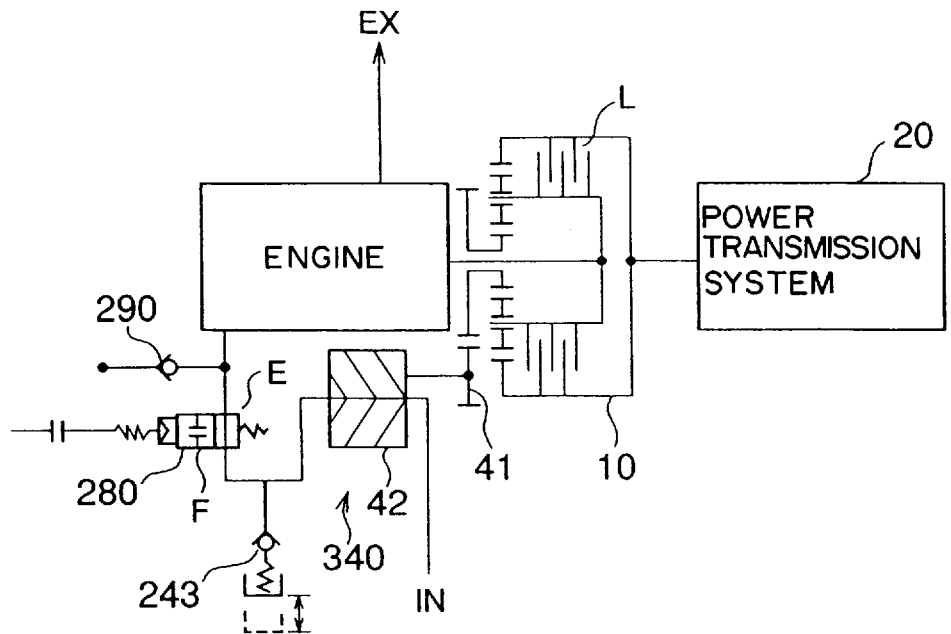
FIG. 13 is an explanatory diagram for a supercharging device according to a fifth embodiment.

A fifth embodiment will now be described while referring to FIG. 13. The structure of the fifth embodiment is the same as that in the fourth embodiment, except for the structure of the mechanical supercharger 240 in the air supply circuit in the fourth embodiment. That is, in a mechanical supercharger 340 for this embodiment, a relief valve 243 is located between a compressor 42 and an air supply circuit opening and closing valve 280 to adjust the pressure of the air that is supplied.

With this arrangement, when the vehicle is halted or when the vehicle is driven forwardly at a low speed, the pressure setting for the relief valve 243 is lowered to reduce the driving output of the compressor 42. The fuel consumption at a halt can therefore be reduced. When the vehicle is driven forwardly at a low speed, the pressure setting is low for the relief valve 243, and the speed of the compressor 42 is increased. Then, the pressure setting for the relief valve 243 is increased drastically from the above state, and high air is instantaneously impelled to the engine 1 at a high pressure to raise the output of the engine 1 early, thus providing better response.

Figure 14:
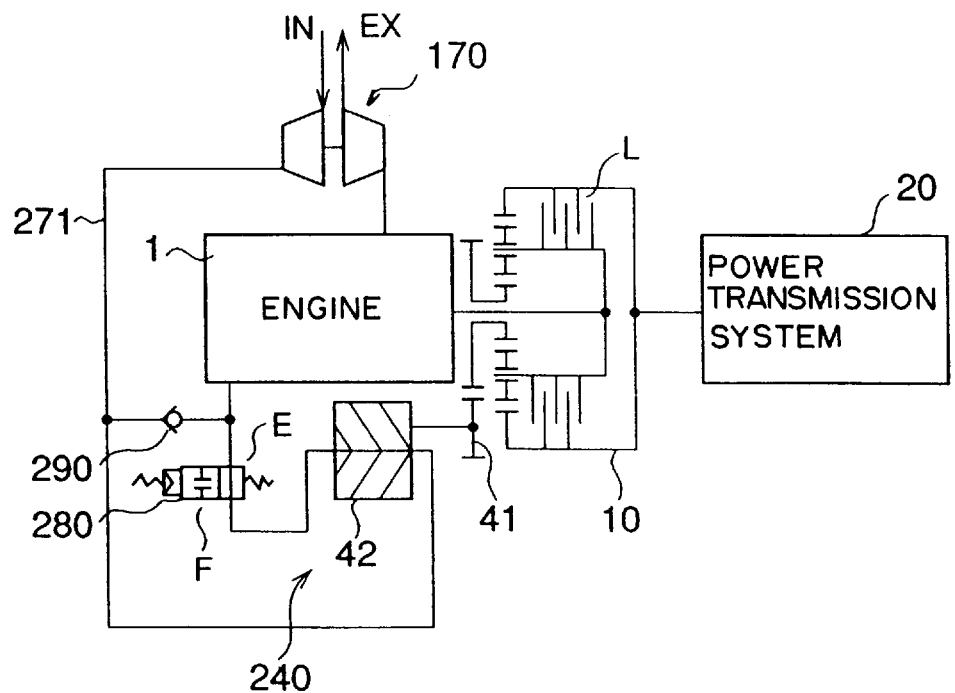
FIG. 14 is an explanatory diagram for a supercharging device according to a sixth embodiment.
Figure 15:
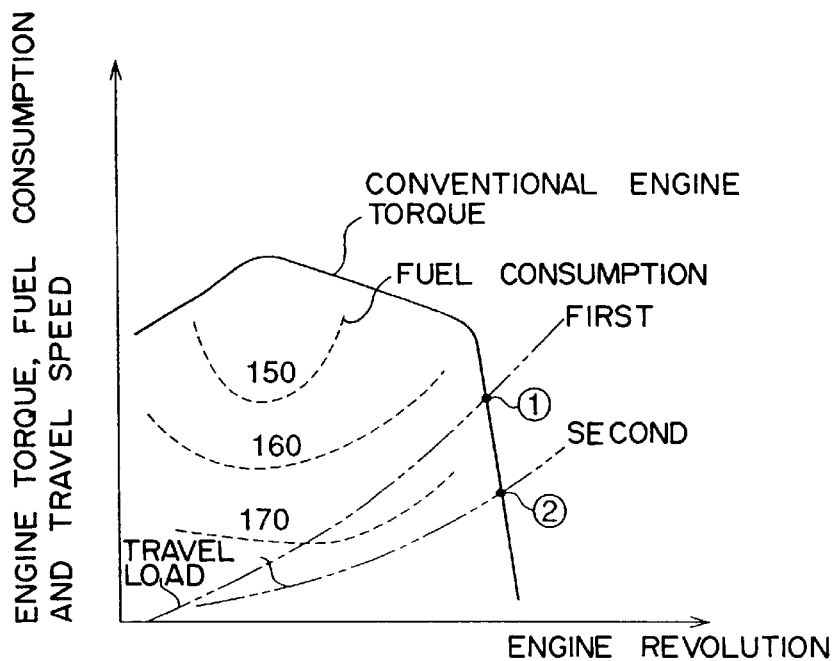
FIG. 15 is a diagram showing a conventional matching characteristic between an engine torque and a vehicle traveling load.
Figure 16:
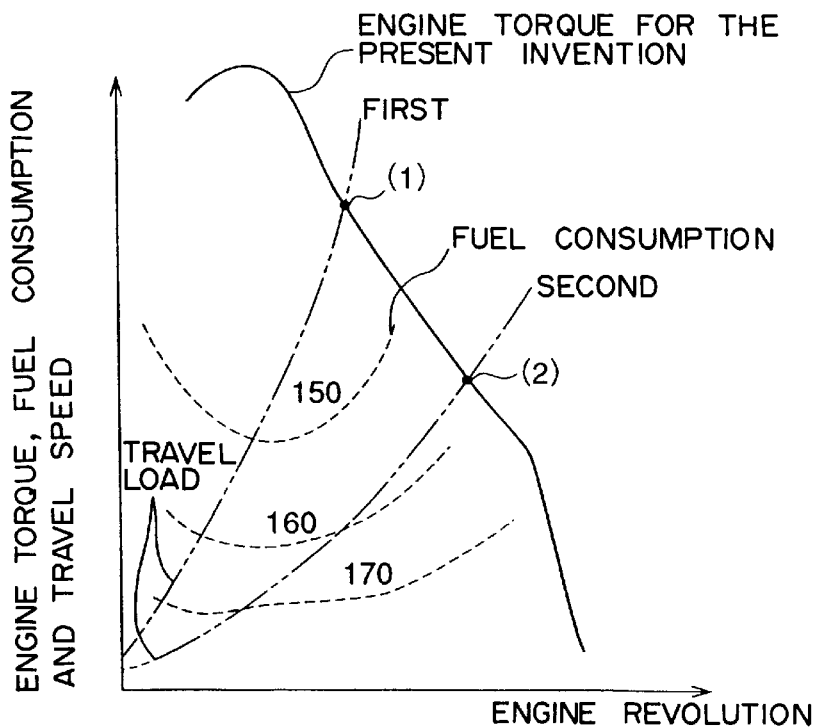
FIG. 16 is a diagram showing a matching characteristic for the present invention between an engine torque and a vehicle traveling load.

A sixth embodiment will now be described while referring to FIG. 14. The structure of this embodiment is the same as that in the fourth embodiment, except for that part of the structure where the turbosupercharger 170 is added to the air supply circuit in the fourth embodiment. An air supply pipe 271 from the turbosupercharger 17 is connected to a check valve 290 of a mechanical supercharger 240 and to a compressor 42.

With this arrangement, when in forward first, or at the time of acceleration, an air supply circuit opening and closing valve 280 is shifted to position E, air is supplied to the engine 1 from the compressor 42, which is driven by the differential planetary gear device 10, and the turbosupercharger 170 in order to raise the output of the engine 1 early. When at high speed, such as in forward third, the air supply opening and closing valve 280 is shifted to position F and air is supplied to the engine 1, via the check valve 290, by the turbosupercharger 170. At this time, the lock-up clutch L of the differential planet gear device 10 is disengaged and the mechanical supercharger 240 is completely halted to prevent an over supply of air. On the other hand, when decelerating, the lock-up clutch L of the differential planetary gear device 10 is engaged and the braking force is increased by using the mechanical supercharger 240. Such a control process can be selected as needed by a command from a controller (not shown).

INDUSTRIAL USABILITY

At the start of the driving of a vehicle, or at a low speed, such as in forward first, the response of the vehicle can be improved, the rotational speed for a mechanical supercharger that corresponds to the load on an engine can be acquired in a period extending from the start of the driving until forward acceleration, and even a small engine can provide a high output with little power loss. At high speed steady driving, the supercharger is switched to a turbosupercharger to eliminate the wasteful supply of air. When at a halt, the pressure for the air that is supplied from the mechanical supercharger can be lowered to reduce fuel consumption. During deceleration, since the differential limiting means is engaged and a forcible rotational torque that is supplied by the wheels is shared by both the engine and the mechanical supercharger, the braking force can be increased. Such a supercharger is therefore useful for a vehicle engine.

What is claimed is:

1. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, wherein said differential planetary gear device comprises a sun gear, a ring gear, at least one planet gear, and a planet carrier, wherein said differential limiter comprises a device for selectively changing between a locked condition and an unlocked condition for at least one of said sun gear, said ring gear, and said planet carrier, to thereby provide a first distribution of said power between said first mechanical output and said second mechanical output for said locked condition and a second distribution of said power between said first mechanical output and said second mechanical output for said unlocked condition, said first distribution being different from said second distribution.

2. Apparatus in accordance with claim 1, further comprising:

an air supply circuit valve having a first position in which air is passed from the atmosphere to said engine, and a second position in which compressed air is passed from said mechanical supercharger to said engine, and a controller for actuating said air supply circuit valve from one of its positions to the other of its positions.

3. Apparatus in accordance with claim 1, further comprising:

a turbosupercharger which is connected so as to be driven by exhaust gas from said engine in order to provide compressed air at an output of said turbosupercharger, an air supply pipe connecting the output of said turbosupercharger to an air input of said mechanical supercharger, an air supply circuit valve arrangement connected to said air supply pipe and to a compressed air output of said mechanical supercharger, and having a first position in which compressed air is passed from said turbosupercharger to said engine, and a second position in which compressed air is passed from said mechanical supercharger to said engine.

4. Apparatus in accordance with claim 1, wherein in said locked condition two of said sun gear, said ring gear, and said planet carrier are locked together, and in said unlocked condition said two are unlocked from each other.

5. Apparatus in accordance with claim 4, further comprising a controller for causing said differential limiter to change from one of said locked condition and said unlocked condition to the other of said locked condition and said unlocked condition.

6. Apparatus in accordance with claim 5, wherein said apparatus is a vehicle, wherein said second mechanical output propels said vehicle, and further comprising a vehicle speed detection sensor for applying a vehicle speed signal to said controller so that said controller causes said differential limiter to change from one of said locked condition and said unlocked condition to the other of said locked condition and said unlocked condition in response to said vehicle speed signal.

7. Apparatus in accordance with claim 1, wherein said differential limiter comprises a lockup clutch connectable between two of said sun gear, said ring gear, and said planet carrier.

8. Apparatus in accordance with claim 1, wherein said differential limiter comprises a lockup clutch connectable between said ring gear and said planet carrier.

9. Apparatus in accordance with claim 8, further comprising a controller for causing said lockup clutch to change from one of said locked condition and said unlocked condition to the other of said locked condition and said unlocked condition.

10. Apparatus in accordance with claim 1, wherein a clutch is connectable between said differential planetary gear device and a drive force transmission system.

11. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, wherein said differential planetary gear device comprises a sun gear, a ring gear, at least one planet gear, and a planet carrier, with said planet carrier being coupled to said output shaft of said engine, with said sun gear being coupled to said first mechanical output, and with said ring gear being coupled to said second mechanical output; and wherein said differential limiter comprises a lockup clutch connectable between said ring gear and said planet carrier.

12. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, a clutch connected to said second mechanical output of said differential planetary gear device, a drive shaft, and a power transmission system connected between said clutch and said drive shaft.

13. Apparatus in accordance with claim 12, further comprising:

a controller, a speed detection sensor associated to said drive shaft for providing a signal representative thereof to said controller, whereby said controller controls said differential limiter responsive to a signal from said speed detection sensor.

14. Apparatus in accordance with claim 12, wherein said differential planetary gear device comprises a sun gear, a ring gear, at least one planet gear, and a planet carrier, with said planet carrier being coupled to said output shaft of said engine, with said ring gear being coupled to said second mechanical output, and with said sun gear being coupled to said first mechanical output; and wherein said differential limiter comprises a lockup clutch connectable between said ring gear and said planet carrier.

15. Apparatus in accordance with claim 12, further comprising:

a controller, an acceleration sensor associated with said engine for detecting an acceleration of said engine and for providing a signal representative thereof to said controller, a speed range sensor for detecting which speed range is selected for said engine and for providing a signal representative thereof to said controller, said controller providing a control signal to said differential limiter in response to signals from said acceleration sensor and said speed range sensor.

16. Apparatus in accordance with claim 15, further comprising a shift lever for selecting a speed range for said engine, wherein said speed range sensor is associated with said shift lever.

17. Apparatus in accordance with claim 16, wherein said acceleration sensor comprises an engine rotational speed sensor.

18. Apparatus in accordance with claim 16, further comprising an accelerator for controlling an output of said engine, and wherein said acceleration sensor comprises an accelerator position detection sensor.

19. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, a turbosupercharger which is connected so as to be driven by exhaust gas from said engine in order to provide compressed air at an output of said turbosupercharger, an air supply circuit for passing air to said engine, an air supply circuit valve located in said air supply circuit and having a first position in which compressed air is passed from said turbosupercharger to said engine, and a second position in which compressed air is passed from said mechanical supercharger to said engine.

20. Apparatus in accordance with claim 19, further comprising a relief valve connected to said air supply circuit and having a relief pressure value, and a controller for actuating said air supply circuit valve from one of its positions to the other of its positions and for adjusting said relief pressure value to thereby control the pressure of the compressed air being passed from said mechanical supercharger to said engine.

21. Apparatus in accordance with claim 19, further comprising an exhaust circuit valve having a first position in which exhaust is passed from said engine to said turbosupercharger, and a second position in which exhaust is passed from said engine to the atmosphere.

22. Apparatus in accordance with claim 21, further comprising a controller for actuating said air supply circuit valve from one of its positions to the other of its positions and for actuating said exhaust circuit valve from one of its positions to the other of its positions.

23. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, a clutch connected to said second mechanical output of said differential planetary gear device, a drive shaft, a power transmission system connected between said clutch and said drive shaft, a turbosupercharger which is connected so as to be driven by exhaust gas from said engine in order to provide compressed air at an output of said turbosupercharger, an air supply circuit valve having a first position in which compressed air is passed from said turbosupercharger to said engine, and a second position in which compressed air is passed from said mechanical supercharger to said engine, and a controller for controlling said air supply circuit valve and said differential limiter.

24. Apparatus in accordance with claim 23, wherein said differential planetary gear device comprises a sun gear, a ring gear, at least one planet gear, and a planet carrier, with said planet carrier being coupled to said output shaft of said engine, with said ring gear being coupled to said second mechanical output, and with said sun gear being coupled to said first mechanical output; and wherein said differential limiter comprises a lockup clutch connectable between said ring gear and said planet carrier.

25. Apparatus in accordance with claim 23, further comprising:

a speed detection sensor associated to said drive shaft for providing a signal representative thereof to said controller, whereby said controller controls said differential limiter responsive to a signal from said speed detection sensor.

26. Apparatus in accordance with claim 23, further comprising:

an acceleration sensor associated with said engine for detecting an acceleration of said engine and for providing a signal representative thereof to said controller, a speed range sensor for detecting which speed range is selected for said engine and for providing a signal representative thereof to said controller, said controller controlling said differential limiter and said air supply circuit valve in response to signals from said acceleration sensor and said speed range sensor.

27. Apparatus in accordance with claim 26, further comprising a shift lever for selecting a speed range for said engine, wherein said speed range sensor is associated with said shift lever.

28. Apparatus in accordance with claim 26, wherein said acceleration sensor comprises an engine rotational speed sensor.

29. Apparatus in accordance with claim 26, further comprising an accelerator for controlling an output of said engine, and wherein said acceleration sensor comprises an accelerator position detection sensor for sensing a position of said accelerator.

30. Apparatus comprising:

an engine having an output shaft, a differential planetary gear device connected so as to be driven by said output shaft, said differential planetary gear device having a first mechanical output and a second mechanical output, said differential planetary gear device having a differential limiter for selectively distributing power, that is produced by said engine, between said first mechanical output and said second mechanical output, and a mechanical supercharger connected to said engine and to said first mechanical output of said differential planetary gear device so that said differential planetary gear device can mechanically drive said mechanical supercharger to provide compressed air to said engine, a clutch connected to said second mechanical output of said differential planetary gear device, a drive shaft, a power transmission system connected between said clutch and said drive shaft, a turbosupercharger which is connected so as to be driven by exhaust gas from said engine in order to provide compressed air at an output of said turbosupercharger, an air supply circuit valve having a first position in which compressed air is passed from said turbosupercharger to said engine, and a second position in which compressed air is passed from said mechanical supercharger to said engine, an exhaust circuit valve having a first position in which exhaust is passed from said engine to said turbosupercharger, and a second position in which exhaust is passed from said engine to the atmosphere, and a controller for controlling said air supply circuit valve, said exhaust circuit valve, and said differential limiter.

31. Apparatus in accordance with claim 30, wherein said differential planetary gear device comprises a sun gear, a ring gear, at least one planet gear, and a planet carrier, with said planet carrier being coupled to said output shaft of said engine, with said ring gear being coupled to said second mechanical output, and with said sun gear being coupled to said first mechanical output; and wherein said differential limiter comprises a lockup clutch connectable between said ring gear and said planet carrier.

32. Apparatus in accordance with claim 30, further comprising:

a speed detection sensor associated to said drive shaft for providing a signal representative thereof to said controller, whereby said controller controls said differential limiter responsive to a signal from said speed detection sensor.

33. Apparatus in accordance with claim 30, further comprising:

an acceleration sensor associated with said engine for detecting an acceleration of said engine and for providing a signal representative thereof to said controller, a speed range sensor for detecting which speed range is selected for said engine and for providing a signal representative thereof to said controller, said controller controlling said differential limiter, said air supply circuit valve, and said exhaust circuit valve in response to signals from said acceleration sensor and said speed range sensor.

34. Apparatus in accordance with claim 33, further comprising a shift lever for selecting a speed range for said engine, wherein said speed range sensor is associated with said shift lever.

35. Apparatus in accordance with claim 33, wherein said acceleration sensor comprises an engine rotational speed sensor.

36. Apparatus in accordance with claim 33, further comprising an accelerator for controlling an output of said engine, and wherein said acceleration sensor comprises an accelerator position detection sensor for sensing a position of said accelerator.

37. A method for supercharging an engine having a power transmission system, wherein said power transmission system can be utilized to propel a vehicle, said method comprising the steps of:

when said vehicle is at a halt and is about to move:

using a differential planetary gear device to brake said power transmission system to increase total power output by said engine;

directing said power output to a mechanical supercharger to rotate said mechanical supercharger to provide compressed air to said engine;

releasing the braking of said power transmission system upon receipt of a start command;

utilizing said differential planetary gear device to distribute said power output between driving said mechanical supercharger and driving said power transmission system; and accelerating said power transmission system.

38. A method in accordance with claim 37, wherein when said vehicle starts moving from a halt and is in a state of acceleration, said method further comprises the step of:

engaging a differential limiter for said differential planetary gear device so that said power output is directly coupled with said mechanical supercharger to accelerate said vehicle.

39. A method in accordance with claim 37, wherein, when said vehicle has been shifted from an acceleration state and is traveling at a steady high speed, said method further comprises the step of disengaging said differential limiter for said differential planetary gear device to reduce power loss at said mechanical supercharger.

40. A method in accordance with claim 39, wherein a turbocharger is driven by exhaust from said engine, and wherein when said vehicle has been shifted from an acceleration state and is traveling at a steady high speed, said method further comprises the steps of:

discontinuing supply of compressed air from said mechanical supercharger to said engine, and supplying compressed air from said turbocharger to said engine.

41. A method in accordance with claim 37, wherein when said vehicle is being decelerated from traveling at a steady high speed, said method further comprises the steps of:

engaging said differential limiter of said differential planetary gear device to distribute said power output to drive said mechanical supercharger and to propel said vehicle, and applying a braking action to said mechanical supercharger to increase a braking force for said vehicle.

42. A method in accordance with claim 37, wherein, when a shift lever of said vehicle is set to neutral and said vehicle is halted, said method further comprises the step of decreasing a pressure of the compressed air that is supplied from said mechanical supercharger to said engine in order to reduce power loss at said mechanical supercharger.

43. A method for supercharging an engine having a power transmission system, a mechanical supercharger, and a turbocharger which can be driven by exhaust from said engine, wherein said power transmission system can be utilized to propel a vehicle, and wherein when said vehicle is at a halt and is about to move, said method comprises the steps of:

locking a differential limiter on a differential planetary gear device to brake said power transmission system to increase total power output by said engine, directing said power output to said mechanical supercharger to rotate said mechanical supercharger to provide compressed air to said engine, and directing exhaust from said engine to the atmosphere; and wherein when said vehicle has been shifted from an accelerated state to a steady high speed driving state and is fully in said steady high speed driving state, said method further comprises the steps of:

unlocking said differential limiter on said differential planetary gear device to reduce power loss at said mechanical supercharger, supplying exhaust from said engine to said turbosupercharger to drive said turbosupercharger, and supplying compressed air from said turbosupercharger to said engine.

44. A method in accordance with claim 43, wherein when said vehicle is shifted from a steady high speed driving state to a decelerated state, said method further comprises the steps of:

supplying compressed air to said engine from said mechanical supercharger rather than from said turbosupercharger, throttling an air supply for said mechanical supercharger to increase power loss at said mechanical supercharger, and applying a braking action to increase a braking force for said vehicle.

45. A method in accordance with claim 43, wherein, when a shift lever of said vehicle is set to neutral and said vehicle is halted, said method further comprises the step of decreasing a pressure of the compressed air that is supplied from said mechanical supercharger to said engine in order to reduce power loss at said mechanical supercharger.

* * * * *